United States Patent
Hughes, Jr.

(10) Patent No.: US 11,945,038 B2
(45) Date of Patent: Apr. 2, 2024

(54) PIPE COUPON RETAINER

(71) Applicant: Mueller International, LLC, Atlanta, GA (US)

(72) Inventor: David Latimore Hughes, Jr., Signal Mountain, TN (US)

(73) Assignee: Mueller International, LLC, Atlanta, GA (US)

(*) Notice: Subject to any disclaimer, the term of this patent is extended or adjusted under 35 U.S.C. 154(b) by 0 days.

(21) Appl. No.: 17/530,120

(22) Filed: Nov. 18, 2021

(65) Prior Publication Data

US 2023/0150040 A1   May 18, 2023

(51) Int. Cl.
*B23B 51/04* (2006.01)
*B23B 27/16* (2006.01)

(52) U.S. Cl.
CPC .......... *B23B 51/044* (2013.01); *B23B 27/16* (2013.01)

(58) Field of Classification Search
CPC ....... B23B 51/04; B23B 47/34; B23B 51/044; B23B 51/0453; B23B 51/0426; B23B 51/0466; B23B 51/05
See application file for complete search history.

(56) References Cited

U.S. PATENT DOCUMENTS

| | | |
|---|---|---|
| 438,740 A | 10/1890 | Eley |
| 485,715 A | 11/1892 | Smith |
| 1,045,289 A | 11/1912 | Hill |
| 2,601,434 A | 6/1952 | Du Bois |
| 2,800,812 A | 7/1957 | Mueller et al. |
| 2,911,859 A | 11/1959 | Longley et al. |
| 4,279,551 A | 7/1981 | Wilterding |
| 5,964,240 A | 10/1999 | Granovski |
| 6,446,662 B1 | 9/2002 | Wagner |
| 7,357,605 B2 * | 4/2008 | Weiler ................ B23B 51/0426 408/67 |
| 7,438,509 B1 | 10/2008 | Wong et al. |
| 7,496,999 B2 | 3/2009 | Robarge |
| 8,104,517 B2 | 1/2012 | German |
| 2,648,563 A1 | 9/2017 | Turner |
| 10,870,157 B2 | 12/2020 | Huffman |
| 11,478,910 B2 | 10/2022 | Mitchell et al. |
| 2006/0188349 A1 | 8/2006 | Weiler |
| 2007/0297867 A1 | 12/2007 | Weiler |
| 2017/0252910 A1 | 9/2017 | Turner |

(Continued)

OTHER PUBLICATIONS

Mitchell, Timothy J.; Non-Final Office Action for U.S. Appl. No. 17/945,163, filed Sep. 15, 2022, dated Apr. 10, 2023, 45 pgs.

(Continued)

*Primary Examiner* — Alan Snyder
(74) *Attorney, Agent, or Firm* — Taylor English Duma LLP

(57) ABSTRACT

A tool can include a tool body defining a recess defining a recess depth measured in a radial direction from an outer diameter of the tool body; and a detent member coupled to the tool body, the detent member including a leg extending from the tool body and sized to be received within the recess of the tool body upon one of deformation and movement of the leg at least partly in a radially inward direction, the leg biased in a radially outward direction by one of a wall of the recess and a biasing element of the tool, the leg configured to catch upon a portion of a pipe coupon surrounding a drilled hole in the pipe coupon to facilitate movement of the pipe coupon with the tool.

10 Claims, 10 Drawing Sheets

(56) References Cited

U.S. PATENT DOCUMENTS

| | | |
|---|---|---|
| 2020/0368828 A1 | 11/2020 | Huffman |
| 2021/0260739 A1 | 8/2021 | Mitchell et al. |
| 2023/0016444 A1 | 1/2023 | Mitchell et al. |

OTHER PUBLICATIONS

Mitchell, Timothy J.; Final Office Action for U.S. Appl. No. 16/799,337, filed Feb. 24, 2020, dated Mar. 28, 2022, 25 pgs.

Mitchell, Timothy J.; Notice of Allowance for U.S. Appl. No. 16/799,337, filed Feb. 24, 2020, dated Jun. 16, 2022, 12 pgs.

Huffman, Jeffrey Allen; Applicant-Initiated Interview Summary for U.S. Appl. No. 16/421,537, filed May 24, 2019, dated Sep. 1, 2020, 3 pgs.

Huffman, Jeffrey Allen; Non-Final Office Action for U.S. Appl. No. 16/421,537, filed May 24, 2019, dated Jul. 22, 2020, 15 pgs.

Huffman, Jeffrey Allen; Notice of Allowance for U.S. Appl. No. 16/421,537, filed May 24, 2019, dated Nov. 10, 2020, 5 pgs.

Mueller Co; Installation Instructions for Mueller Inserting Valves, revised Jun. 1972, 16 pgs.

Grainger; Article entitled: "Steel Toggle Bolt Anchor, #10-24 Anchor Thread Size x2-5/8 Usable Length, 50 pk", accessed on Jan. 16, 2020, 4 pgs.

Mitchell, Timothy J.; Applicant-Initiated Interview Summary for U.S. Appl. No. 16/799,337, filed Feb. 24, 2020, dated Jan. 5, 2022, 6 pgs.

Mitchell, Timothy J.; Non-Final Office Action for U.S. Appl. No. 16/799,337, filed Feb. 24, 2020, dated Oct. 22, 2021, 31 pgs.

Mitchell, Timothy J.; Requirement for Restriction/Election for U.S. Appl. No. 16/799,337, filed Feb. 24, 2020, dated Jul. 22, 2021, 7 pgs.

Mueller Co.; Data sheet for Mueller H-17619 Inspection Flange Replacement Parts, published Dec. 2006, 1 pg.

Koppl Pipeline Services; Article entitled: "Hot Tapping", available at <https://www.koppl.com/hot-tapping/>, accessed on Nov. 19, 2021, 3 pgs.

Mueller Co.; Article entitled: "CL-12 Drilling Machine", Copyright 2016, 20 pgs.

Pipeman Products, Inc.; Article entitled: "TapMaster Carbide Tipped Hot Tap Pilots with Dual Retention Wires", available at <https://pipemanproducts.com/products.php?cat=TapMaster-Carbide-Tipped-Hot-Tap-Pilots>, accessed on Nov. 19, 2021, 1 pg.

tollbin.com; Article entitled: "Coupon Retention Pilot Drills, Drill Shafts, Spaid Insert Tips and Pilot Drill Tips", available at <https://www.2bin.om/Pilot-Drill-Bits-ALL.shtml>, accessed on Nov. 19, 2021, 9 pgs.

Mueller Co; Catalog for Mueller Large Drilling Machines, publicly available prior to one year before May 24, 2019, 54 pages.

Mueller Co; Drawings of a pilot drill for a pipe cutting tool, publicly available prior to one year before May 24, 2019, 1 pg.

Mitchell, Timothy J.; Requirement for Restriction/Election for U.S. Appl. No. 17/945,163, filed Sep. 15, 2022, dated Feb. 13, 2023, 7 pgs.

Mitchell, Timothy J.; Final Office Action for U.S. Appl. No. 17/945,163, filed Sep. 15, 2022, dated Sep. 20, 2023, 32 pgs.

Mitchell, Timothy J.; Notice of Allowance for U.S. Appl. No. 17/945,163, filed Sep. 15, 2022, dated Jan. 17, 2024, 18 pgs.

* cited by examiner

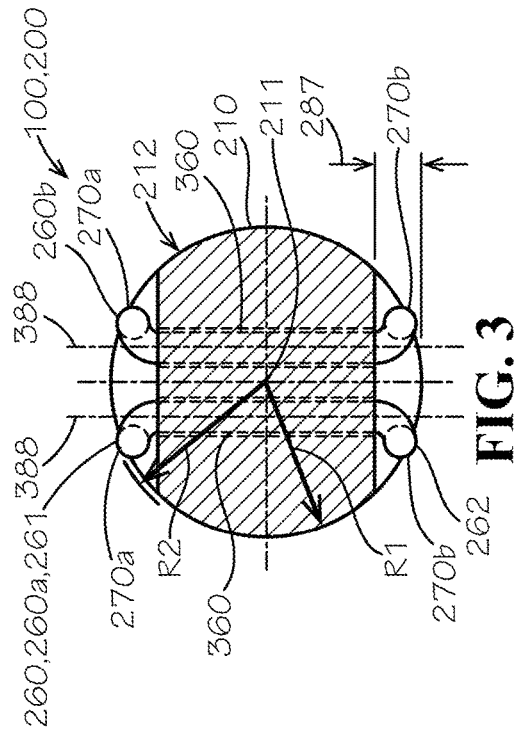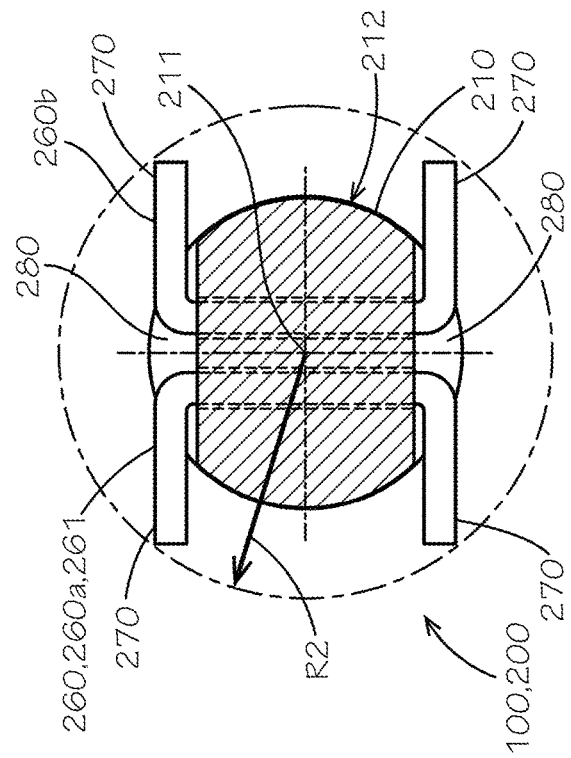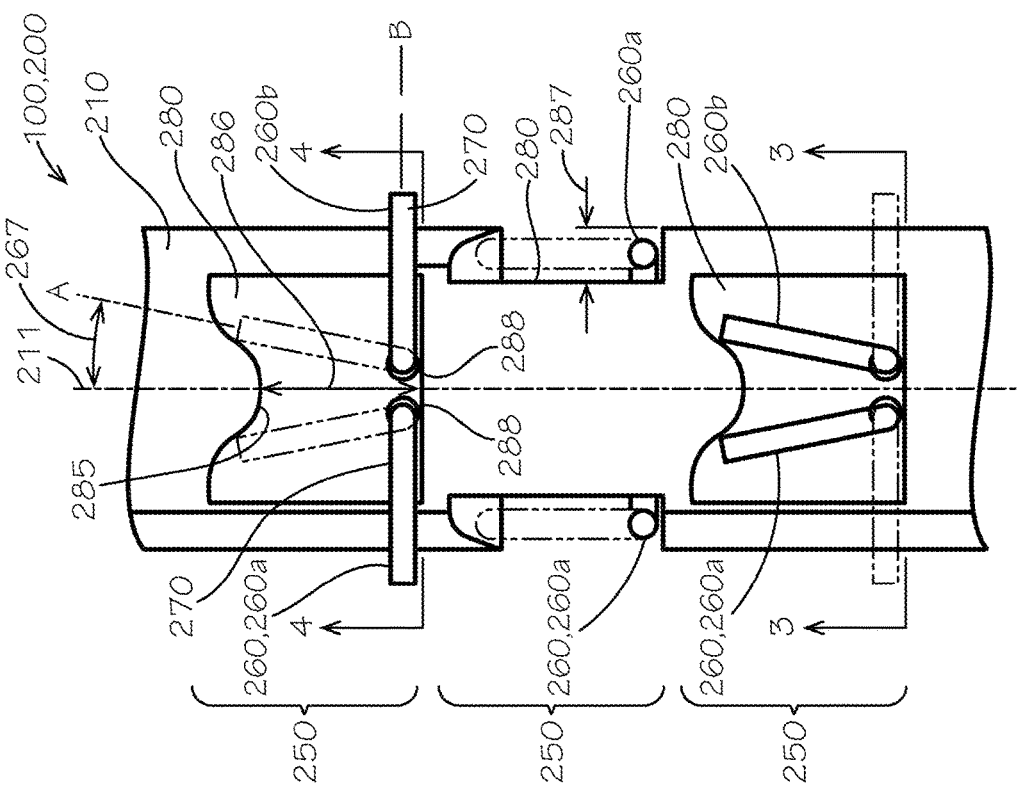

PIPE COUPON RETAINER

TECHNICAL FIELD

Field of Use

This disclosure relates to pipe coupon extraction tools. More specifically, this disclosure relates to pipe coupon extraction tools able to remove a pipe coupon once cut from a pipe.

Related Art

A pipe coupon can be cut from an installed pipe, which can be buried in the ground and can form part of a fluid distribution system such as a municipal water supply system. In addition to cutting the pipe coupon—a process often performed with a special tool resembling a large hole saw—it can be desirable to remove the pipe coupon, all without allowing leakage of the fluid in the system from the pipe. Cutting and removing the pipe coupon is often done when the pipe remains pressurized. Such removal of the pipe coupon in all conditions can be difficult.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a tool comprising: a tool body defining a recess defining a recess depth measured in a radial direction from an outer diameter of the tool body; and a detent member coupled to the tool body, the detent member comprising a leg extending from the tool body and sized to be received within the recess of the tool body upon one of deformation and movement of the leg at least partly in a radially inward direction, the leg biased in a radially outward direction by one of a wall of the recess and a biasing element of the tool, the leg configured to catch upon a portion of a pipe coupon surrounding a drilled hole in the pipe coupon to facilitate movement of the pipe coupon with the tool.

In a further aspect, disclosed is a tool comprising: a cutter configured to cut a first hole defining a first diameter; and a drill bit coupled to the cutter, the drill bit configured to cut a second hole defining a second diameter, the second diameter being smaller than the first diameter, the drill bit comprising: a tool body defining a recess; and a detent member coupled to the tool body, the detent member comprising a leg extending from the tool body and sized to be received within the recess of the tool body upon one of deformation and movement of the leg, the leg biased in a radially outward direction by one of a wall of the recess and a biasing element of the tool.

In yet another aspect, disclosed is a method of using a tool, the method comprising: obtaining a tool comprising: a tool body defining a recess; and a detent member coupled to the tool body, the detent member comprising a leg extending from the tool body; receiving the detent member of the tool body within the recess of the tool body upon one of deformation and movement of the leg by pushing the leg in a radially inward direction against a biasing of the leg in a radially outward direction with an edge of a hole formed in a portion of a pipe; passing the detent member of the tool through the hole formed in the portion of the pipe in an insertion direction; catching the detent member upon the portion of the pipe upon movement of the tool in a removal direction; and moving a pipe coupon with the tool.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 2 is a detail side view of the pilot drill or tool head of FIG. 1 taken from detail 2 of FIG. 1.

FIG. 3 is a sectional view of the tool head of FIG. 1 taken along line 3-3 of FIG. 2, i.e., with legs of corresponding detent members of the tool head in a non-extended position.

FIG. 4 is a sectional view of the tool head of FIG. 1 taken along line 4-4 of FIG. 2, i.e., with the legs of the corresponding detent members in an extended position.

DETAILED DESCRIPTION

Figure 1:
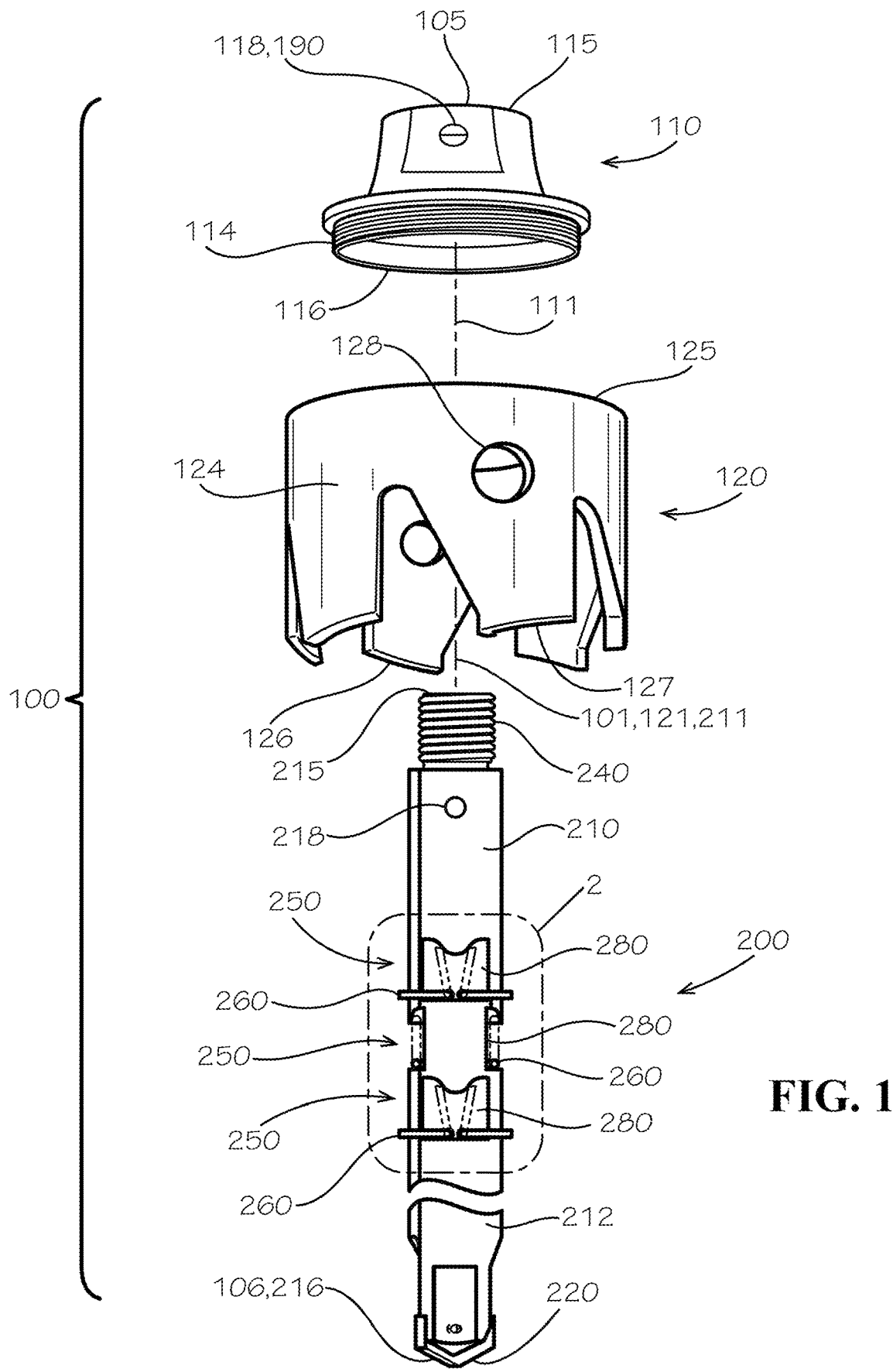
FIG. 1 is an exploded side perspective view of a tool comprising a pilot drill, a shell cutter, and a cutter hub in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a tool nearest to and facing a recess in the tool sized to receive a detent member; "rear" is that end of the tool head that is opposite or distal the front; "left" is that which is to the left of or facing left from a person facing towards the front; and "right" is that which is to the right of or facing right from that same person facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a pipe coupon extraction device and associated methods, systems, devices, and various apparatuses are disclosed herein. In some aspects, the pipe coupon extraction device can comprise a detent member, which can be a barb member. In some aspects, the pipe coupon extraction device can comprise a biasing element.

FIG. 1 is an exploded side perspective view of an extraction device or tool 100, which can be a pipe coupon extraction device or a pipe coupon retainer. In some aspects, as shown, the tool 100 can be a cutting apparatus or drilling apparatus or pipe cutter, in accordance with one aspect of the current disclosure. As shown, the tool 100 can comprise a cutter hub 110 and a cutter 120, which can be a coupon cutter or shell cutter. The cutter 120 can be configured to cut a first hole defining a first diameter. The tool can define a first end 105 and a second end 106. In some aspects, the tool 100 can comprise a tool head 200, which can comprise or can be a pilot drill or a drill bit. More specifically, the tool head 200, which can be coupled to the cutter 120, can be configured to cut a second hole defining a second diameter, and the second diameter can be smaller than the first diameter. As shown, the parts of the tool 100 can be assembled to each other along a tool axis or longitudinal axis 101. More specifically, the cutter hub 110 can define a hub axis 111, the cutter 120 can define a cutter axis 121, and the tool head 200 and, more specifically, a tool body 210 thereof can define a longitudinal axis 211.

The cutter hub 110 can define a first end 115 and a second end 116 distal from the first end 115. The cutter hub 110 can define a threaded portion 114 on or proximate to the second end 116 for engagement with a corresponding threaded portion (not shown) of the cutter 120. The cutter hub 110 can define a hole 118, which can be sized to receive a fastener 190. The fastener 190 can be used to assemble the tool head 200 to the cutter hub 110 and to fix the parts with respect to one another. A firm, positive connection between the cutter hub 110 and the tool head 200 such as with the fastener 190 can be beneficial due to the high torque values that can be experienced by the tool 100 during use.

The cutter 120 can define a first end or trailing end 125 and a second end or leading end 126 distal from the trailing end 125. The cutter 120 can define the aforementioned threaded portion (not shown) proximate to the trailing end 125. The cutter 120 can comprise a wall 124 and, as part of the wall 124, can define a plurality of teeth 127 proximate to the leading end 126. In some aspects, the cutter 120 can define an outer diameter measuring, for example and without limitation, in a range of 3 inches to 12 inches. The cutter 120 can further define one or more clearance holes 128, which can be used to facilitate removal of waste such as a pipe coupon 85 (shown in FIG. 14) or a plurality of pipe coupons 85 from the cutter 120 after cutting of a pipe 80 (shown in FIG. 14).

The tool head 200, which can be the aforementioned pilot drill, can define the tool body 210, which can define a first end 215, a second end 216, and the longitudinal axis 211. The tool body 210 can define a fastener hole 218, which can be sized to receive the fastener 190 and can in some aspects create the aforementioned connection between the cutter hub 110 and the tool head 200, specifically the tool body 210 of the tool head 200. In some aspects, the tool head can comprise or define a threaded portion 240, which can secure the tool head or, more generally, the tool 100 to a neighboring structure such as, for example, a larger tool or structure for driving the tool 100.

The tool head 200 and, more specifically, the tool body 210 can define a detent location or station 250. In some aspects, the tool head 200 and, more specifically, the tool body 210 can define a plurality of detent stations 250, which can be offset in a longitudinal direction along the axis 211 with respect to each other and can face in different radial directions with respect to each other. As shown, the tool head 200 can comprise at least three detent stations 250, and each detent station can be oriented to face in a direction that is angled 90 degrees with respect to an adjacent detent station. The detent station 250 can comprise a detent member 260, which can be received within a recess 280 defined in the tool body 210.

The tool body 210, which can be a drill body or shaft, can comprise a cutting edge 220. The cutting edge 220 can be positioned proximate to an outer surface 212 of the tool body 210. In some aspects, the cutting edge 220 can be positioned on a tip of the tool head 200 on or proximate to the second end 216. In some aspects, the cutting edge 220 can be positioned on, protruding from, or proximate to a radially outermost portion of the outer surface 212. The tool body 210 can be configured to rotate about the longitudinal axis 211 during use and thereby cut through a wall 83 (shown in FIG. 13) of the pipe 80 (shown in FIG. 13) with the aid of the cutting edge 220.

FIG. 2 is a detail side view of the tool head 200 and, more generally, the tool 100 of FIG. 1 taken from detail 2 of FIG. 1. As shown, the detent member 260 and, more specifically, a detent member 260a, of each detent station 250 can be coupled to the tool body 210. A detent member such as, for example and without limitation, the detent member 260a, which can be a first detent member 260a, can comprise a leg 270. The leg 270 can extend from the tool body 210 and can be sized to be received within the recess 280 of the tool body 210. More specifically, the leg 270 can extend from the tool body 210 in a radial direction of the tool body 210 with respect to the axis 211 thereof. In some aspects, the tool 100 can comprise a second detent member 260b, which can be coupled to the tool body 210 and can be any detent member that acts separately or independently from a first detent member such as, for example and without limitation, the first detent member 260a. The leg 270 of the second detent member 260 can extend from the tool body 210. In some aspects, as shown, the second detent member 260b can extend, at least in part, from and also be sized to be selectively received within the same recess 280 from which the first detent member 260a extends. In some aspects, the second detent member 260b can extend from and also be sized to be selectively received within a separate recess 280 defined in the tool body 200. For example and without limitation, the first detent member 260a and the second detent member 260b can extend from opposite sides of the tool head 200.

In some aspects, as shown, the detent member 260 and, more specifically with respect to any of the features described herein, either of the detent members 260a,b can define a constant cross-section from a first end 261 (shown in FIG. 3) to a second end 262 (shown in FIG. 3) thereof. In some aspects, the detent member 260 can vary in cross-section along its length from the first end 261 to the second end 262. In some aspects, the detent member 260 can be formed from wire defining a circular shape in cross-section, as shown. For example and without limitation, the detent member 260 can be formed from wire having a diameter of at least ⅛ inch. More specifically, the detent member 260 can be formed from wire having a diameter of about ⅛ inch. In some aspects, the detent member 260 can be formed from a wire or a bar material defining a square or, more generally, a rectangular shape in cross-section. In some aspects, a cross-section of the detent member 260 can define any polygonal or non-polygonal (i.e., comprising one or more curved elements) shape.

The tool body 210 can define a detent member bore 288, which can be defined in a surface of the tool body 210 at least partially defining the recess 280. The detent member bore 288 can be sized to receive a corresponding detent member 260. In some aspects, the detent member 260 can be received tightly within or can be secured tightly to the tool body 210 such that at least an attachment point of the detent member 260 to the tool body 210 the detent member 260 does not move or rotate. In some aspects, the detent member 260 can be configured to rotate inside the detent member bore 288 between a retracted position A and an extended position B. In some aspects, in the retracted position A the detent member 260 can be angled at an angle 267, which can measure less than 90 degrees but greater than 0 degrees with respect to the axis 211 as shown.

A wall 285 at least partially defining the recess 280 can define the angle 267, which can encourage the detent member 260 to fall into the path of the pipe coupon 85 (shown in FIG. 14) after the detent member 260 passes through a hole in the pipe coupon 85 by biasing the leg 270 in a radially outward direction with respect to the axis 211. Use of the two detent members 260a,b can increase the likelihood that at least one of the detent members 260a,b catches on an inside of the pipe coupon 85 once the pipe coupon 85 is cut and the tool 100 used to remove the pipe coupon 85. When both of the detent members 260a,b catch on an inside of the pipe coupon 85 once the pipe coupon 85 is cut and the tool 100 is used to remove the pipe coupon 85, the catching of an inside of the pipe coupon 85 by detent members 260 extending in opposite directions can result in the pipe coupon 85 being evenly balanced upon removal with the tool 100 and not tilted away from the vertical axis. More specifically, during movement and/or removal of the pipe coupon 85, an axis of the hole 1480 (shown in FIG. 14) of the pipe coupon 85 can remain aligned—or substantially aligned, considering at least an average orientation of the pipe coupon 85 over time during removal—with the axis 211 of the tool, an axis of a cut axis 901 (shown in FIG. 13) or the removal direction 1610 (shown in FIG. 16). As shown, a minimum value of an axial height or axial length 286 of the recess 280 at the wall 285 can be less than a maximum value of the axial length 286. In some aspects, the wall 285 can extend continuously across and define a top axial end of the recess 280. In some aspects, the wall 285 can be separate from the top axial end of the recess 280. As shown, each recess 280 can define a recess depth 287.

More specifically, in some aspects, in the retracted position A the angle 267 can be less than or equal to 45 degrees but greater than 0 degrees with respect to the axis 211. In some aspects, in the retracted position A the angle 267 can be less than or equal to 20 degrees but greater than 0 degrees with respect to the axis 211. In some aspects, in the retracted position A the angle 267 can be less than or equal to 10 degrees but greater than 0 degrees with respect to the axis 211. In some aspects, in the retracted position A the angle 267 can be less than or equal to 6 degrees but greater than 0 degrees with respect to the axis 211. As shown, in the extended position B the detent member 260 can be angled at 90 degrees with respect to the axis 211.

FIG. 3 is a sectional view of the tool head 200 of FIG. 1 taken along line 3-3 of FIG. 2, i.e., with the legs 270 of the corresponding detent members 260a,b in a non-extended position. Again, the recess 280 can define the recess depth 287, which can be measured in a radial direction from the outer surface 212 of the tool body 210 and, more specifically, from a radially outermost portion of the outer surface 212. In an undeformed condition, a radius R2 measured to a radially outermost portion of any one or more of the legs 270 of the corresponding detent members 260 can be greater than a radius R1 of the tool body 210, which can be measured to a radially outermost portion of the tool body 210. Again, the leg 270 and, more generally, the detent member 260 can be biased in a radially outward direction by the wall 285 of the recess 280. In some aspects, the detent member 260 can be sized to be received within the recess 280 upon deformation of the leg 270 such that the radius R2 is not greater than the radius R1, as will be described below. As such, the tool head 200 and, more generally, the tool 100 can be spring-loaded. In some aspects, the radius R2 can be variable between the detent members 260, between the detent stations 250, and between the tools 100, including when the detent members 260 are hand cut and formed in place, e.g., with wire cutters and/or a hammer or other forming or hitting tool. In some cases, the radius R2 can be made constant by forming the detent members 260 in a controlled manufacturing environment, e.g., a factory. In some aspects, smooth operation of each detent member 260 can be maintained by the mounting portion 360 being straight and not bent along its length. In some aspects, smooth operation of each detent member 260 can be maintained by each portion of the detent member 260 including each of the legs 270 being straight and not bent along its length.

Any one or more of the detent members 260a,b or the single detent member 260 can comprise a mounting portion 360. Any one or more of the detent members 260a,b can comprise a first leg 270a and a second leg 270b, each of which can extend from the mounting portion 360 and be sized to be received within the recess of the tool body 210 upon deformation of at least one of the legs 270a,b during use. The second leg 270 can be configured to catch upon a second portion of the pipe coupon 85 surrounding a bore or hole 1480 (shown in FIG. 14) in the pipe coupon 85 to facilitate movement (e.g., removal) of the pipe coupon 85 (shown in FIG. 14) with the tool 100. An axis 388 of each of the detent member bores 288 can be offset from the axis 211. The axes 388 can be offset from each other. As shown, a diameter of the detent member bore 288 can be greater than a diameter of the material forming the second detent member 260b and, more specifically, a diameter of the detent member bore 288 can be greater than a diameter of the mounting portion 360.

By biasing the legs 270 of the corresponding detent members 260a,b in a radially outward direction, the legs 270 of the first detent member 260a can be configured to catch upon a portion of the pipe coupon 85 (shown in FIG. 14) surrounding the hole 1480 in the pipe coupon 85 to facilitate movement of the pipe coupon 85 with the tool 100, and one or more legs 270 of the second detent member 260b can be configured to catch upon a second portion of the pipe coupon 85 surrounding the hole 1480 in the pipe coupon 85 to facilitate movement of the pipe coupon 85 with the tool 100.

FIG. 4 is a sectional view of the tool head 200 of FIG. 1 taken along line 4-4 of FIG. 2, i.e., with the legs 270 of the corresponding detent members 260a,b in an extended position. As shown, the radius R2 can be greater with the legs 270 in an extended position than with the legs 270 in a non-extended position such that the detent members 260a,b can more securely push against an inside surface of the pipe coupon 85 and thereby move the pipe coupon 85 from one position to another.

Figures 5, 6:
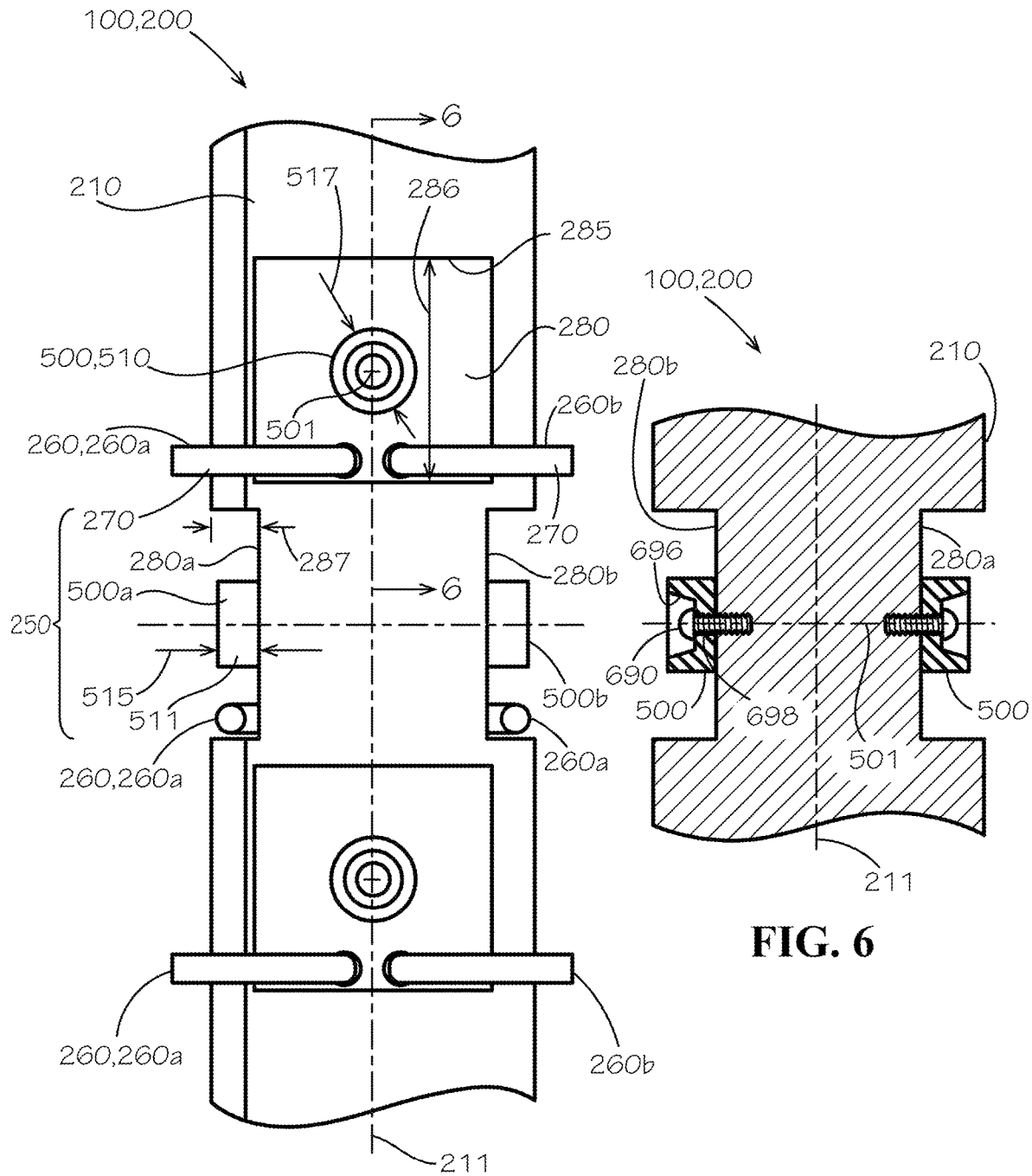
FIG. 5 is a detail side view of the tool head of FIG. 1 taken from the same view as detail 2 of FIG. 1 in accordance with another aspect of the current disclosure.
FIG. 6 is a sectional view of the tool head of FIG. 5 taken along line 6-6 of FIG. 5.

FIG. 5 is a detail side view of the tool head 200 of FIG. 1 taken from the same view as detail 2 of FIG. 1 in accordance with another aspect of the current disclosure. As shown, the tool head 200 can comprise a biasing element 500. The biasing element 500 can be configured to bias the leg 270 of the detent member 260 or the detent members 260a,b in a radially outward direction beyond the outer diameter R1 (shown in FIG. 3) of the tool 100 in a default condition of the tool 100. The default condition of the tool 100 can be the aforementioned non-extended position of the legs 270 of the detent member 260 or the detent members 260a,b (the non-extended position shown, for example, in FIG. 3). More specifically, the biasing element 500 can be configured to bias the leg 270 in a radially outward direction relative to the axis 211 of the tool body 210. As shown, the wall 285 of the recess 280 can be flat, and the axial length 286 of the recess 280 can be constant across the recess 280 in a direction perpendicular to the axis 211.

The biasing element 500 can comprise a body 510 and can define a height 515 and a diameter 517. The height 515 can be less than the recess depth 287 of the tool body 210. The body 510 can define a circular shape in cross-section and, more specifically, can define a cylindrical outer surface 511. More specifically, a radius measured from the axis 211 to a radially outermost portion of the biasing element 500 can be less than the radius R1 (shown in FIG. 3) of the tool body 210. The biasing element 500 can comprise a resilient material, which can define a material memory causing the material to spring back to its original shape after a load on the biasing element 500 is removed. In some aspects, a durometer of the biasing element 500 can be 25 to 85 on the Shore A scale. In some aspects, a durometer of the biasing element 500 can be 25 to 60 on the Shore A scale. In some aspects, a durometer of the biasing element 500 can be 25 to 35 on the Shore A scale. In some aspects, a durometer of the biasing element 500 can be about 35 on the Shore A scale.

In some aspects, a position of the biasing element 500 can be offset in an axial direction of the tool body 210 from the axis 388 (shown in FIG. 3) or, in the case of multiple axes 388, the axes 388. In some aspects, a position of the biasing element 500 can be offset in an axial direction of the tool body 210 from a bottom end or a top end of the recess 280. The axis 388 or the axes 388 can be positioned close enough to a center of the recess 280 and to each other, where applicable, in a radial or transverse direction for the corresponding detent member 260 or detent members 260a,b to be supported by a bottom wall of the recess 280 upon expansion or extension of the detent member 260 or the detent members 260a,b. As shown, an axis 501 of the biasing element 500 can intersect the axis 211 or can be centered in the recess 280. Each detent station 250 can comprise a pair of biasing elements 500, in which case a first biasing element 500a can be secured or mounted to and inside a first recess 280a, and a second biasing element 500b can be secured or mounted to and inside a second recess 280b. More specifically, the biasing elements can be mounted on opposite sides or, more specifically, radially opposite sides of the tool head 200.

FIG. 6 is a sectional view of the tool head 200 of FIG. 5 taken along line 6-6 of FIG. 5. The biasing element 500 can be secured to the tool body 210 with a fastener 690, a portion of which, e.g., a head, can be recessed within a recess 696 of the biasing element 500. The fastener 690 can extend through a bore 698 defined in the biasing element 500. In some aspects, as shown, the biasing element 500 can be or can comprise a bumper.

Figure 7:
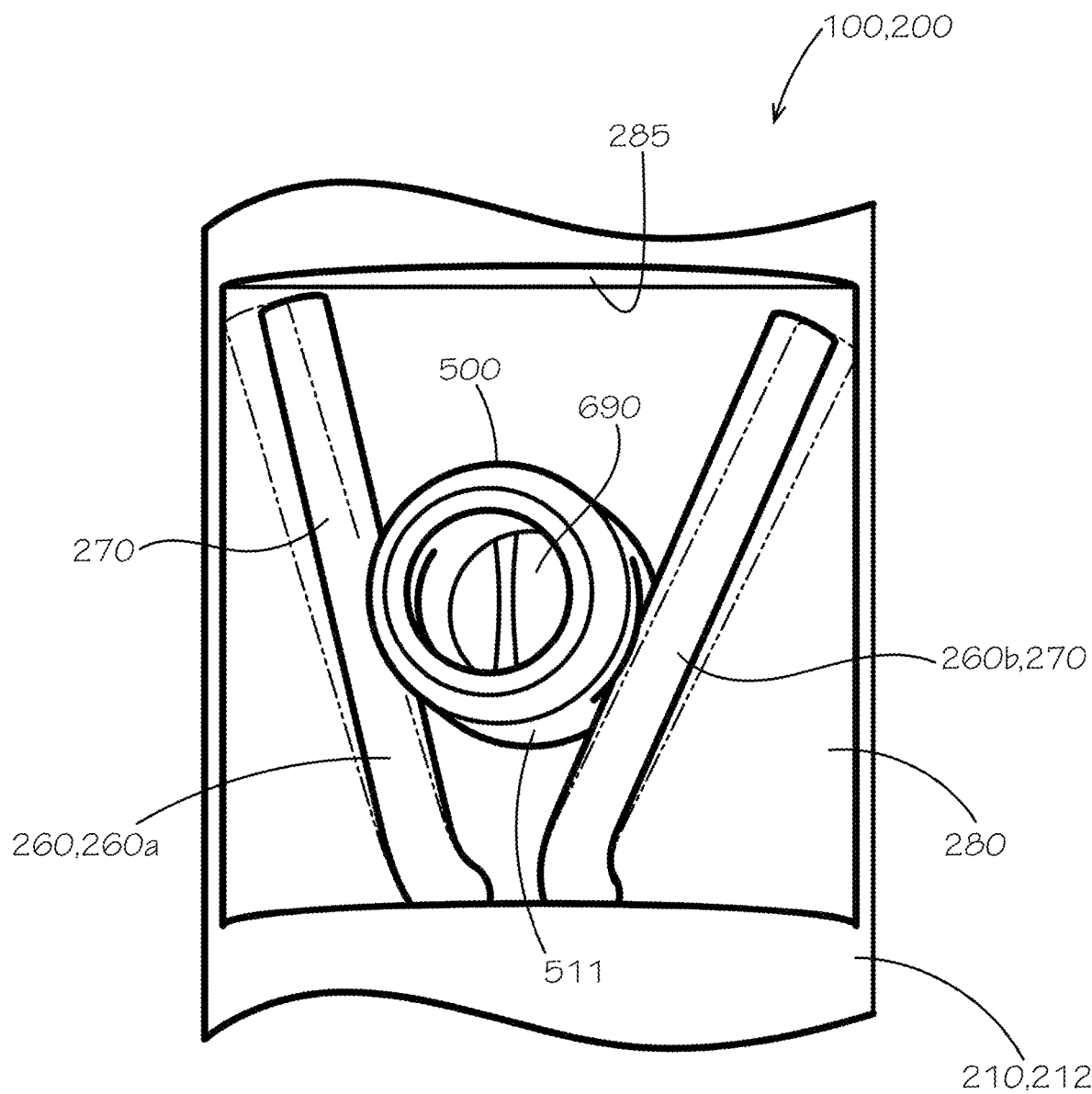
FIG. 7 is a side perspective view of the tool head of FIG. 5.

FIG. 7 is a side perspective view of the tool head 200 of FIG. 5. As shown with a non-extended position of the detent members 260a,b shown in broken lines, the respective legs 270 of the detent members 260a,b can be biased in a radially outward direction—or, in some aspects, in a direction perpendicular to the axis 211 (shown in FIG. 5)—by the biasing element 500 of the tool 100. Again, the leg 270 can be configured to catch upon a portion of the pipe coupon 85 (shown in FIG. 14) surrounding the hole 1480 (shown in FIG. 14) in the pipe coupon 85 to facilitate movement of the pipe coupon 85 with the tool 100. As shown with a non-extended position of the detent members 260a,b shown in solid lines, the respective legs 270 of the detent members 260a,b can be configured to be pushed in a radially inward direction to clear the hole 1480, which can be a drilled hole or pilot hole. More specifically, the detent members 260a,b can contact the outer surface 511 of the biasing element 500 in a non-extended position of the detent members 260a,b. As shown, the outer surface 511 and, more generally, the biasing element 500 can deform or, more specifically, compress upon pushing of the detent members 260a,b against the biasing element 500. Again, in some aspects, the detent members 260a,b can be sized to be received within the recess 280 upon movement of the respective legs 270 and deformation of an adjacent structure such as the biasing element 500.

Figures 8, 9:
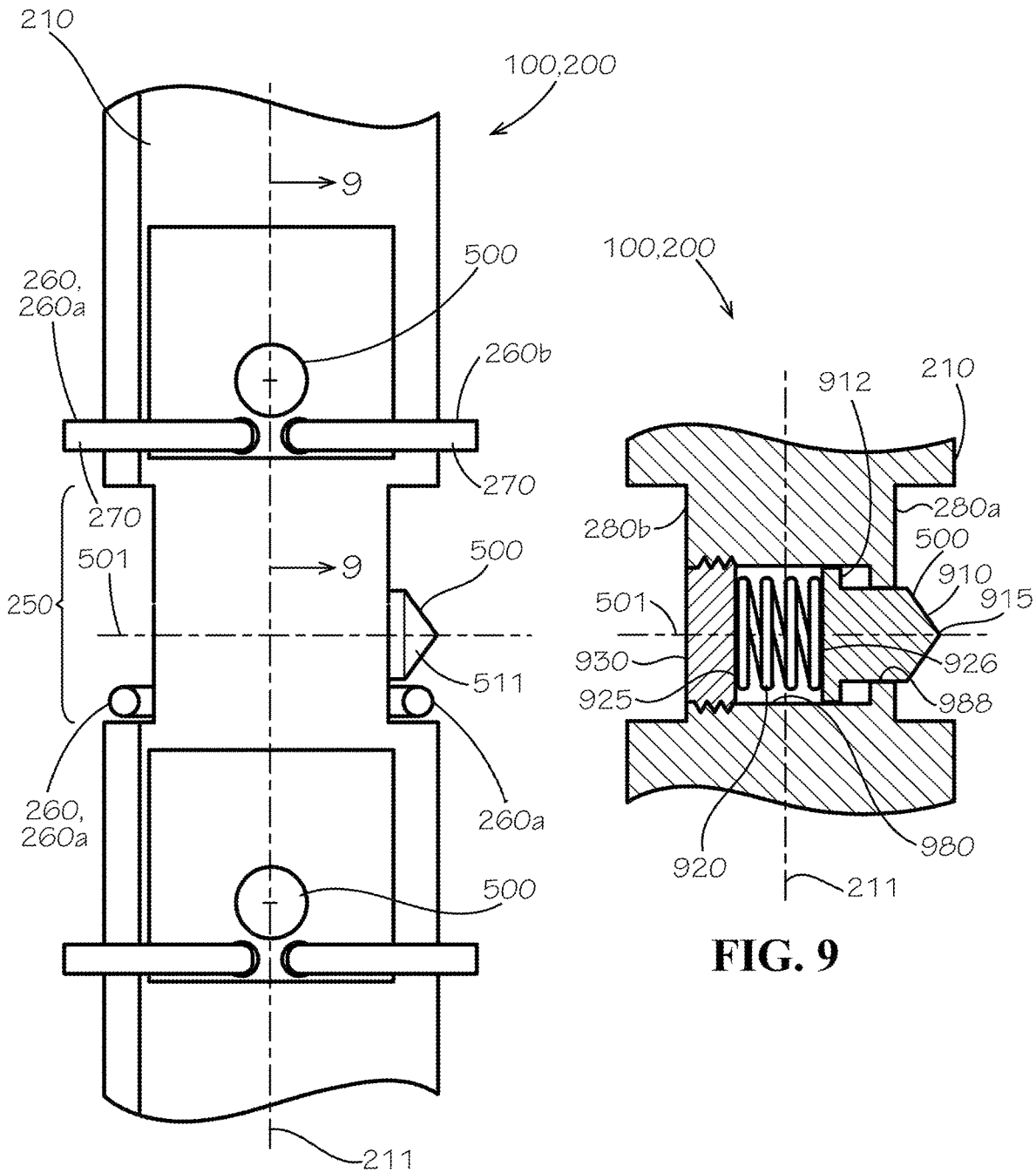
FIG. 8 is a detail side view of the tool head of FIG. 1 taken from the same view as detail 2 of FIG. 1 in accordance with another aspect of the current disclosure.
FIG. 9 is a sectional view of the tool head of FIG. 8 taken along line 9-9 of FIG. 8.

FIG. 8 is a detail side view of the tool head 200 of FIG. 1 taken from the same view as detail 2 of FIG. 1 in accordance with another aspect of the current disclosure. In some aspects, as shown, the biasing element 500 can be positioned on only one side of the tool head 200 in each detent station 250. In other aspects, as discussed above, the biasing element 500 can be positioned on both sides of the tool head 200 in each detent station 250. The biasing element 500 can define a taper. More specifically, the outer surface 511 of the biasing element 500 can define a conical or frustoconical shape, which can be rotationally symmetric about the axis 501.

FIG. 9 is a sectional view of the tool head 200 of FIG. 8 taken along line 9-9 of FIG. 8. The biasing element 500 can comprise a plunger 910. The biasing element 500 can comprise a spring 920. The biasing element 500 can comprise a support or base 930.

The plunger 910 can define a tip 915, which can extend from a surface of the recess 280a and adjacent to the legs 270 (shown in FIG. 8). In the case of more than one leg 270, the plunger 910 can be positioned between two adjacent legs 270a,b (shown in FIG. 8). The plunger 910 can define a flange 912, which can define a diameter that is greater than a diameter of a bore 988 defined in the tool body 210 and, more specifically, the recess 280a. The plunger 910 can be received within a bore or cavity 980 of the tool body 210. The plunger 910 can thereby be retained within the cavity 980 during use. The plunger 910 can be configured to be inserted and removed through an end of the cavity 980 defined in a side of the tool body 210 opposite that of the bore 988. The bore 988 can define the axis 501 of the biasing element 500 shown, and the axis 501 can be angled with respect to the axis 211. More specifically, the axis 501 can be angled with respect to the axis 211 by 90 degrees.

The spring 920 can allow movement of the plunger 910 in an axial direction along the axis 501 upon loading of the spring 920. In some aspects, as shown, the spring 920 can be a compression spring and, more specifically, a coil spring. In some aspects, the spring 920 can be any compressible material defining a spring constant (e.g., a resilient material such as, for example and without limitation, a natural or synthetic rubber). The spring can define a first axial end 925 and a second axial end 926. The biasing element 500 and, more specifically, the plunger 910 can be configured to move in a radially inward direction upon a radially inwardly acting load exerted by the detent member 260 or the detent members 260a,b (shown in FIG. 8).

The base 930 can hold in place or prevent movement of the first axial end 925 of the spring 920. In some aspects, as shown, the base 930 can be removably secured to the tool body 210 and upon removal can allow insertion and/or removal of the plunger 910 and the spring 920. More specifically, the base 930 can comprise or can define a threaded portion, which can facilitate secure attachment of the base 930 to the tool body 210. In some aspects, the base 930 can be formed monolithically, i.e., formed as a singular component that constitutes a single material without joints or seams, with the tool body 210. For example and without limitation, the cavity 980 can be a blind hole defined in and extend from the recess 280a and after insertion of the plunger 910 the plunger 910 can be retained within the cavity 980 with a retaining ring (not shown) installed in an axially outward end of the bore 988 relative to the axis 501.

Figure 10:
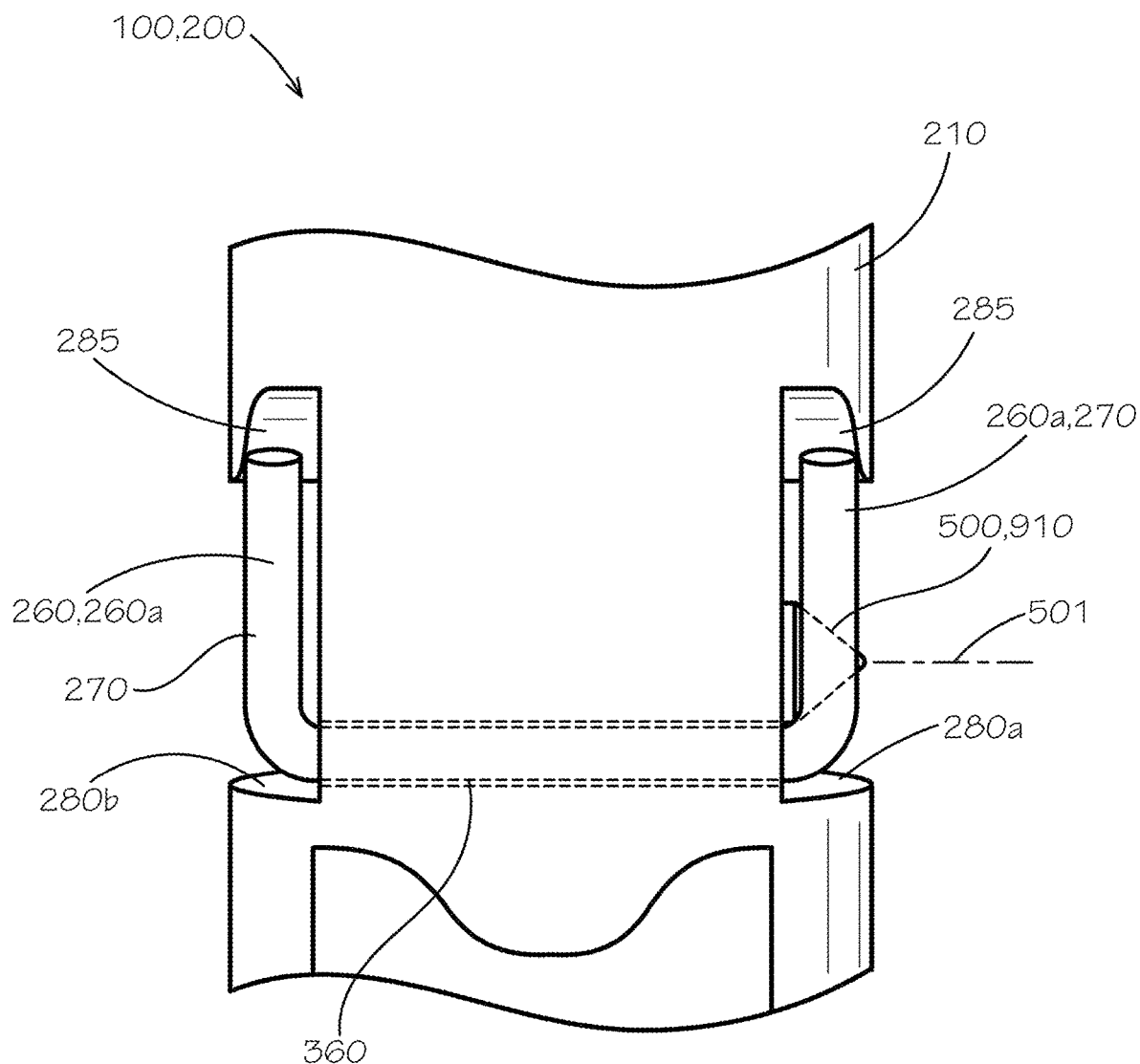
FIG. 10 is a side perspective view of the tool head of FIG. 8.

FIG. 10 is a side perspective view of the tool head 200 of FIG. 8. A leg 270 of one of the detent member 260a (and similarly, the detent member 260b shown in FIG. 8) can contact the plunger 910 of the biasing element 500. As the leg 270 is pushed further inward upon insertion of the tool head 200 through the pipe coupon 85 (shown in FIG. 14), the plunger 910 can retract into the tool body 210 along the axis 501. When the detent members 260a,b are connected via the mounting portion 360, the leg 270 of the detent member 260a can follow the radially inward movement of the detent member 260b into a radially inward non-extended position. In some aspects, the wall 285 can be shaped as described with respect to FIG. 2. In some aspects, the wall 285 can be shaped as described with respect to FIG. 5.

Figures 11, 12:
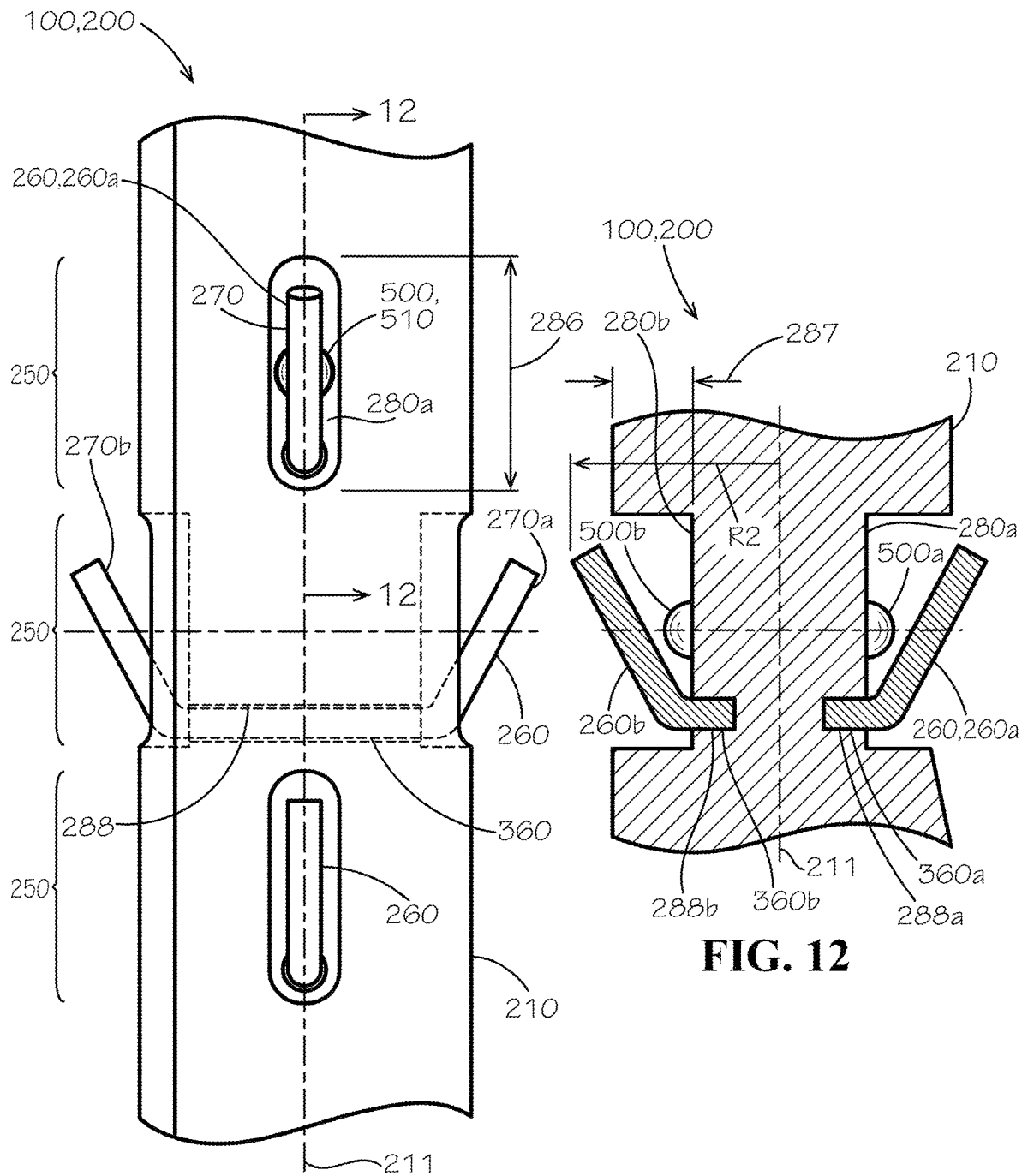
FIG. 11 is a detail side view of the tool head of FIG. 1 taken from the same view as detail 2 of FIG. 1 in accordance with another aspect of the current disclosure.
FIG. 12 is a sectional view of the tool head of FIG. 11 taken along line 12-12 of FIG. 11.

FIG. 11 is a detail side view of the tool head 200 of FIG. 1 taken from the same view as detail 2 of FIG. 1 in accordance with another aspect of the current disclosure. With or without the biasing element 500 (shown in just one of the detent stations 250, although it can be incorporated into any number or none of the detent stations 250), the detent member 260 can be coupled to the tool body 210. The recesses 280a,b (280b shown in FIG. 12) can be wide enough to receive the detent member 260 or the detent member 260a,b and the biasing element 500, at least when present, but narrow enough to discourage or prevent rotation of the detent member 260 or the detent members 260a,b to the left or to the right when facing the recess 280. Instead, in some aspects as shown, the detent member 260 or the detent members 260a,b can be configured to rotate in and out of the recess 280 relative to the axis 211. In some aspects, including when the detent member 260 or the detent member 260a,b are coplanar with the axis 211, the pipe coupon 85 (shown in FIG. 14) can be moved in the removal direction 1610 (shown in FIG. 16) without tilting the pipe coupon 85 or catching the pipe coupon 85 on the pipe 80 (shown in FIG. 14) upon removal. In some aspects, as shown, the detent members 260 can be secured to the tool body 210 of the tool head 200. Again, the detent members 260 can comprise the two legs 270a,b joined by the mounting portion 360.

FIG. 12 is a sectional view of the tool head 200 of FIG. 11 taken along line 12-12 of FIG. 11. As shown, the separate detent members 260a,b can be received within detent member bores 288a,b and can be separately secured to the tool body 210 of the tool head 200. The biasing elements 500a,b, not shown in cross-section, can be positioned between the respective detent members 260a,b and the tool body 210. Upon rotation of the detent members 260a,b inward or outward during use of the tool 100, the respective biasing elements 500a,b can compress or expand. The depth 287 of each recess 280a,b and/or the specific shape or curvature of the detent members 260a,b can be adjusted to decrease or increase the amount of deformation in the detent members 260a,b required to push the detent members 260a,b into the respective recess 280a,b. Increasing the depth 287 and/or increasing a radius of curvature at respective intersections between the legs 270 and mounting portions 360a,b, for example, can facilitate more elastic deformation and less plastic deformation of the detent members 260a,b, which can facilitate radially outward rotation of the detent members 260a,b and catching of the detent members 260a,b on the pipe coupon 85 (shown in FIG. 14) or the pipe coupons 85 after passage of the tool head 200 through the hole 1480 (shown in FIG. 14) defined in the pipe 80 (shown in FIG. 14), which can define the radius R2 as again shown.

Figure 13:
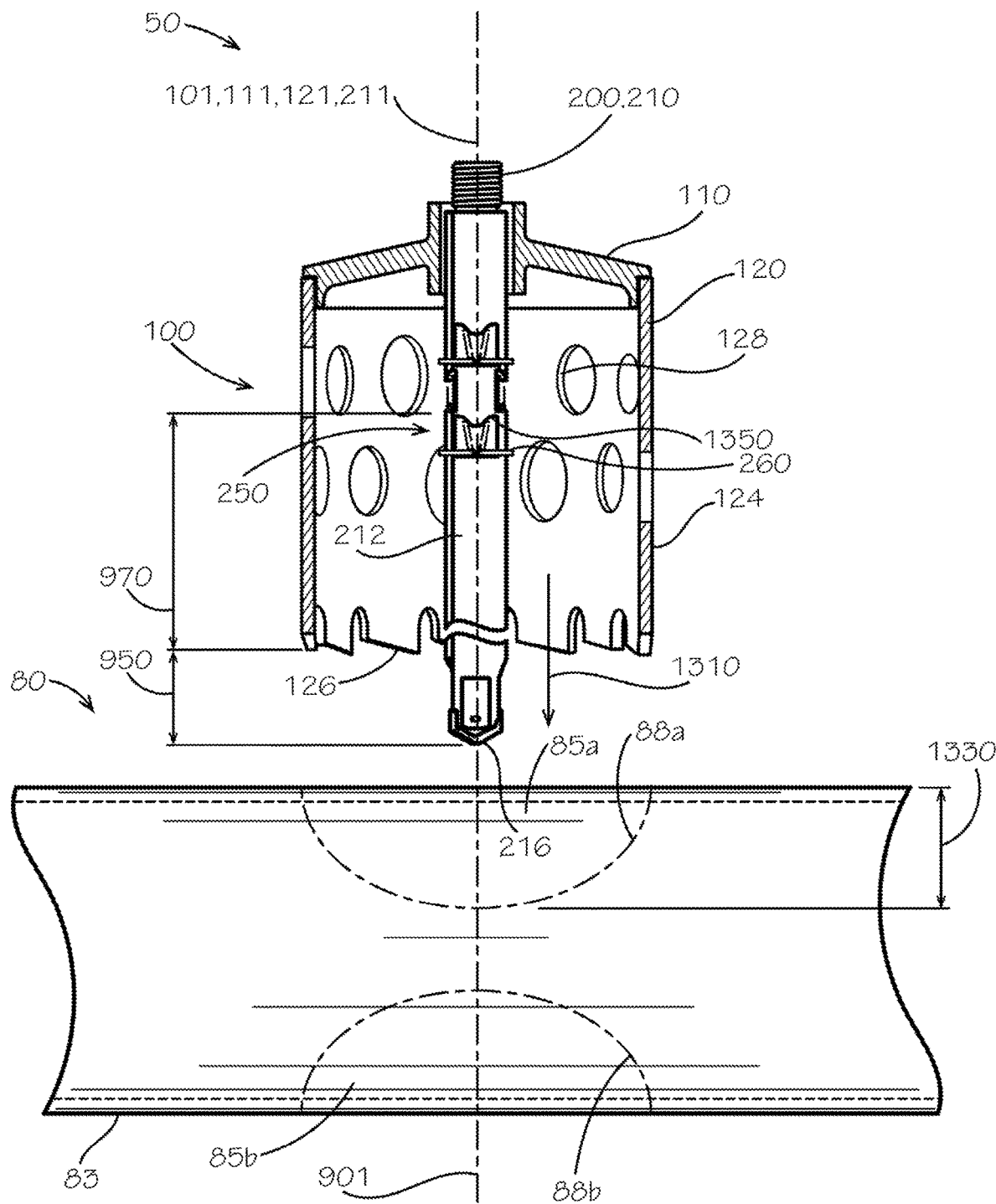
FIG. 13 is a side view of a shell cutting system for cutting a pipe before removal of pipe coupons from a pipe wall of the pipe, with the shell cutter shown in cross-section.

FIG. 13 is a side view of a system 50, which can be a shell cutting system, for cutting a pipe 80 before removal of pipe coupon 85 from a pipe wall 83 of the pipe 80, with the tool 100 shown in cross-section. The tool 100 can define the wall 124 and can be guided by the pilot drill or tool head 200, which can define a cut axis 901 extending through the pipe 80. In some aspects, the tool 100 can be used with or as part of an insertion valve assembly shown and described with respect to FIG. 1 of U.S. Patent Publication No. 2021/0260739, which is incorporated herein by reference. More specifically, use of a knife gate valve and accompanying parts of the insertion valve assembly can facilitate drilling of a hole in even a pressurized system 50. As shown, an inner surface of the wall 124 can be offset from the outer surface 212 of the tool body 210 of the tool head 200. The leading end 126 of the cutter 120 can be offset in an axial direction by an offset distance 950 behind a tip of the leading end or second end 216 of the tool body 210 of the tool head 200 to allow the tool head 200 to sufficiently engage first with the pipe 80 and prevent the aforementioned "walking" of the tool 100 on the surface of the pipe 80.

A portion of the detent station 250 such as a trailing edge 1350 thereof can be offset by an offset distance 970 from the leading end 126 of the cutter 120. The detent station 250 can be offset towards the cutter hub 110 by the offset distance 970 to limit the extension of the tool head 200 beyond the cutter 120. More specifically, the offset distance 970 can be adjusted so that the detent station 250 and, more specifically, the detent member 260 engages the pipe coupons 85a,b before the pipe coupons 85a,b are fully cut from the pipe 80, which will generally be the case when the offset distance 970 is less than a coupon height 1330 shown (not taking into account the thickness of the wall 83, which can effectively increase the coupon height 1330).

The cutter hub 110 and the cutter 120 can be configured to rotate together with the tool head 200 about the longitudinal axis 101 during use and thereby also cut through the wall 83 of the pipe 80 in a cutting direction 1310. The tool head 200, which can again be a pilot drill, can first drill a pilot hole, e.g., the hole 1480 (shown in FIG. 14), and the tool head 200 can then guide the movement of the cutter 120 through a larger surrounding portion of the wall 83 at cut lines 88a,b. The detent member 260 of the detent station 250 can pivot or rotate radially inward towards the disengaged position when the tool head 200 is going through the wall 83—and in the process drilling the hole 1480—and then can rotate outward towards the engaged position after the tool head 200 exits the wall 83 after drilling the hole 1480. Upon cutting through the wall 83 of the pipe 80, the pipe coupons 85a,b can remain and will generally need to be removed so as not to block the pipe 80 or cause blockage or damage downstream from the pipe 80. Removal of the pipe coupons 85a,b can be facilitated by the detent member 260 catching on—or, alternately stated, catching the detent member 260 on—one or both of the pipe coupons 85a,b proximate to one or both of the hole 1480, depending on the specific arrangement of the detent station 250 on the tool head 200. In some aspects, only the lower pipe coupon 85b need be retained by the detent station 250 because the upper pipe coupon 85a can be retained by the lower pipe coupon 85b. It can be beneficial for the pipe coupons 85a,b to separate from each other and nest within the cutter 120 because, for example, a shorter cutter 120 can then be used. After the tool 100 has drilled through the pipe 80, an operator can reach up into the cutter 120, e.g., with a tool, to remove the pipe coupons 85a,b. More specifically, the operator can push the detent member 260 radially inward to disengage the detent member 260 and release the pipe coupons 85a,b and can then manually remove the pipe coupons 85a,b.

Figure 14:
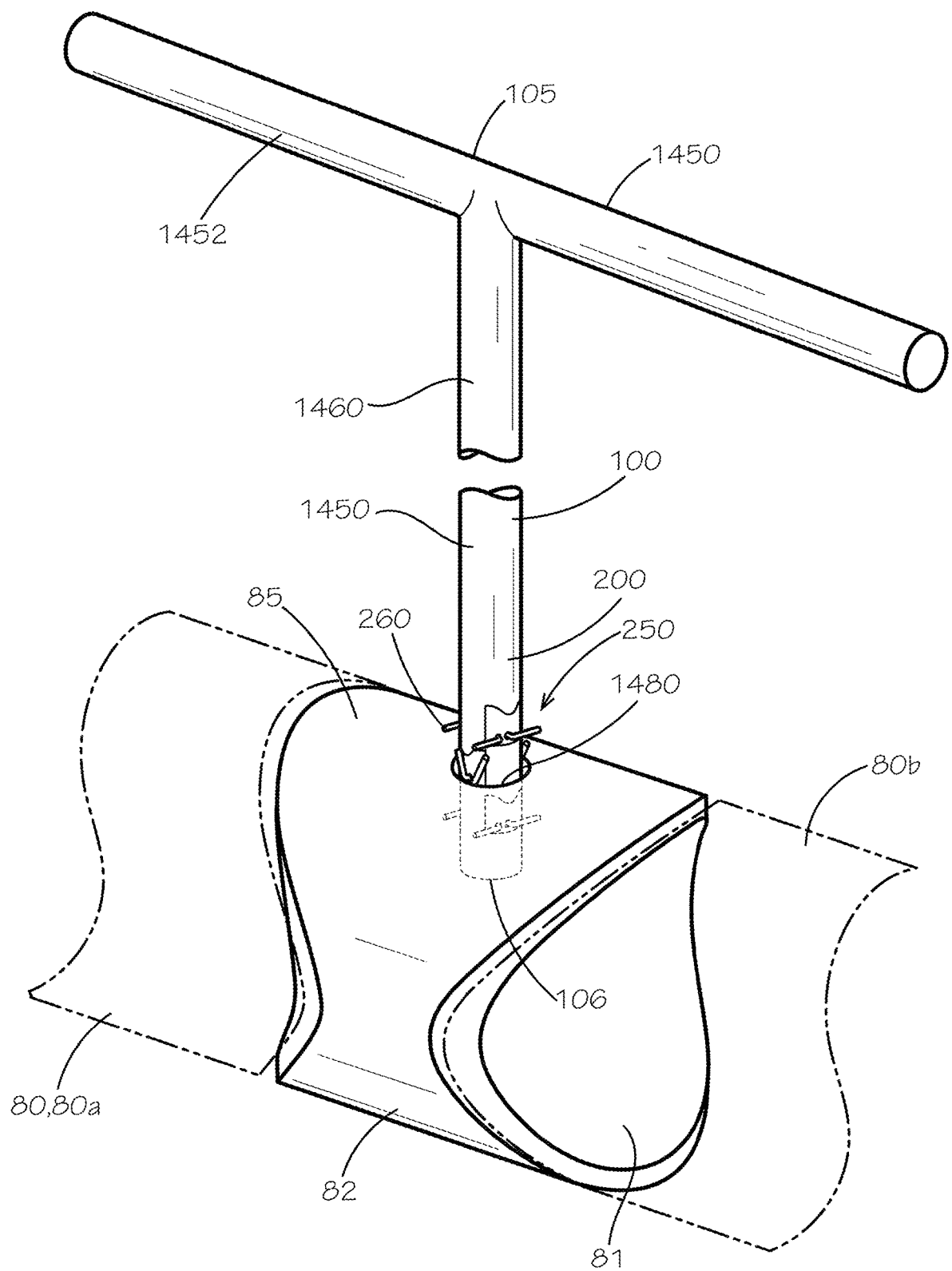
FIG. 14 is a top perspective view of a pipe coupon extraction tool of FIG. 1 and a pipe coupon after it has been cut from the pipe of FIG. 13.

FIG. 14 is a top perspective view of a pipe coupon extraction tool 100 of FIG. 1 and the pipe coupon 85 after it has been cut from the pipe 80 of FIG. 13. In some aspects, the tool 100 can engage the pipe coupon 85 through a structure such as, for example and without limitation, the aforementioned insertion valve assembly, which again is shown and described with respect to FIG. 1 of U.S. Patent Publication No. 2021/0260739. In the process of cutting a full pipe coupon 85, pipe sections or pipe portions 80a and 80b can result. As shown, the tool 100 can, more specifically, engage with the pipe coupon 85 such that the tool 100 can manipulate a position of (i.e., move) the pipe coupon 85. In some aspects, the tool 100 can be part of an even higher-level pipe coupon extraction system or assembly.

Being originally a section of the pipe 80, the pipe coupon 85 can define similar features as the pipe 80 including, for example and without limitation, an inner surface 81, an outer surface 82, a diameter, and a wall thickness. The pipe coupon 85 can further define the hole 1480, which can receive the tool 100 as shown and, at least when the tool head 200 of the tool 100 comprises a drill bit, even be formed by the tool 100. In some aspects, as shown, the pipe 80 and the pipe coupon 85 can be substantially circular in cross-section. In some aspects, the pipe 80 and the pipe coupon 85 can define a non-circular shape in cross-section.

The tool 100 can comprise the tool head 200 and a tool extension 1450. Again, the tool head 200 can comprise one or more of the detent stations 250, which can comprise the detent members 260 and can be configured to engage the pipe coupon 85 or other structure. In some aspects, the tool extension 1450 can comprise a central shaft or pole or shaft 1460. In some aspects, the tool extension 1450 can be removably coupled or secured to the tool head 200 with a fastener, which can be a removable fastener such as, for example and without limitation, a pin extending through the tool head 200 and the tool extension 1450 and a cotter pin extending through the pin to secure the pin in position. In some aspects, the tool extension 1450 can be secured to the tool head 200 with threading on one or both of the tool extension 1450 and the tool head 200 such as, for example and without limitation, the threaded portion 240 (shown in FIG. 1). The tool extension 1450 can extend any desired distance from the tool head 200. In some aspects, the shaft 1460 of the tool extension 1450 can be formed monolithically with the tool head 200. As shown, the tool 100 can comprise a handle portion 1452, which can define the first end 105. The tool 100 can further define the second end 106.

Figure 16:
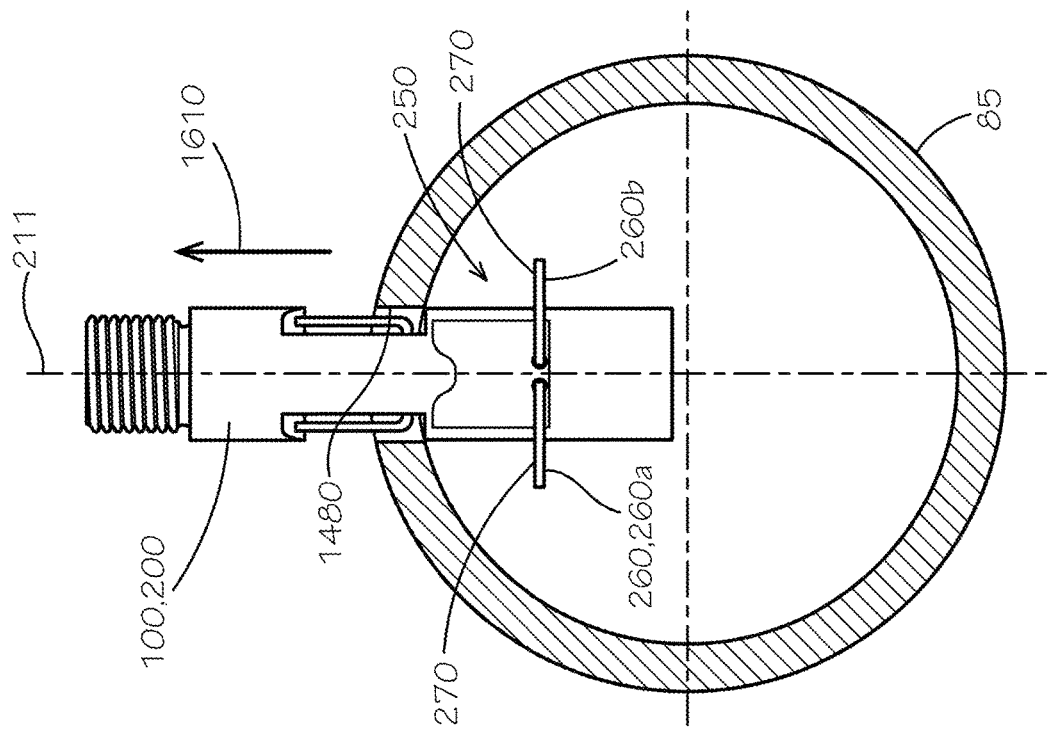
FIG. 16 is a sectional view of the portion of the pipe coupon extraction tool of FIG. 14 after insertion in and engagement with the pipe coupon of FIG. 14.
Figure 15:
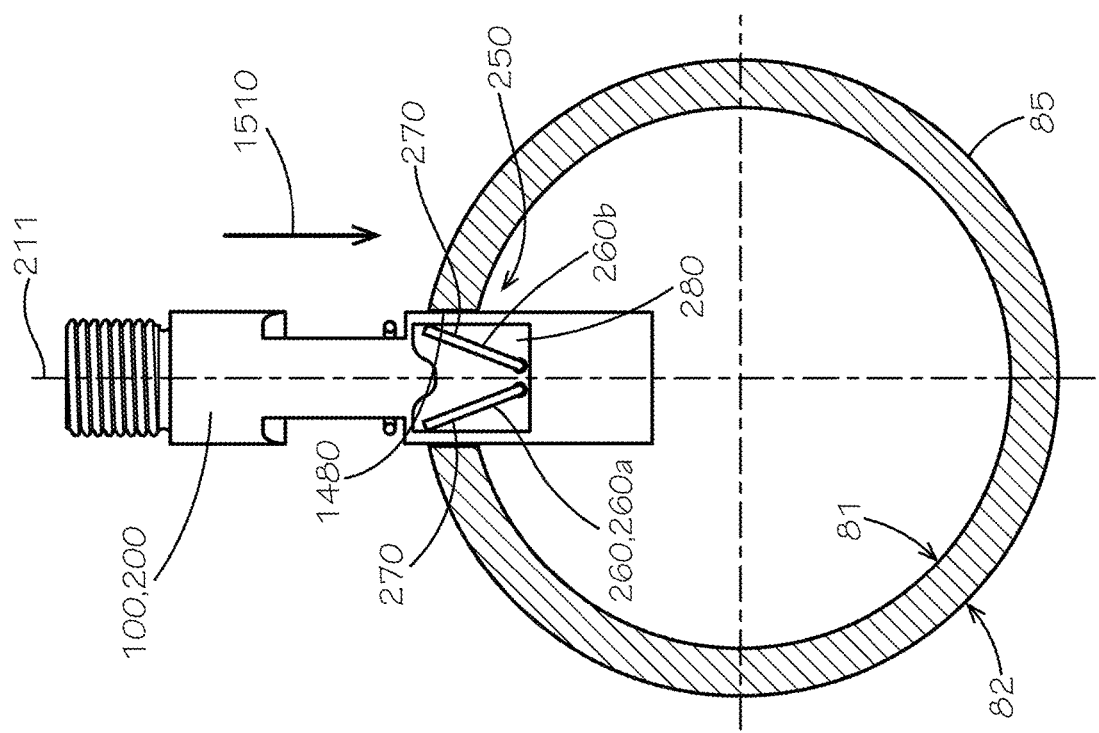
FIG. 15 is a sectional view of a portion of the pipe coupon extraction tool of FIG. 12 during insertion in the pipe coupon of FIG. 14.

FIGS. 15 and 16 are sectional views of the tool 100 of FIGS. 2-4 with the pipe coupon 85. FIG. 15 is a sectional view of a portion of the tool 100 of FIG. 14 during insertion in the pipe coupon 85 of FIG. 14 in an insertion direction 1510, while FIG. 16 shows the same tool head 200 after insertion in and engagement with the pipe coupon 85. As shown, one or more of the detent members 260a,b can, as needed, retract into the tool head 200 as the tool head 200 extends through the hole 1480 and into the pipe coupon 85.

As shown in FIG. 16, after insertion and passage of the detent station 250 and, more specifically, the detent members 260a,b through the hole 1480, the detent members 260a,b can either by the force of gravity or by action of the biasing element 500 (shown in FIG. 5) pushing against the legs 270 of the detent members 260a,b expand, extend, or open inside the pipe coupon 85. In some aspects, the detent members 260a,b can be configured for one-way insertion only so as not to be retracted without moving the pipe coupon 85 or shearing or otherwise breaking the detent member 260 or the detent members 260a,b. In some aspects, as shown, the tool 100 and, more specifically, the tool head 200 can comprise multiple instances of the detent stations 250.

Various components of the tool 100 can be formed from or comprise a metal such as, for example and without limitation, steel. More specifically, the detent member 260 or the detent members 260a,b can be formed from spring steel. In some aspects, the various components can be formed from any other material, any of which can optionally be corrosion-resistant or replaceable for serviceability. The various components of the pipe coupon extraction tool 100 can be formed from any one or more of a variety of manufacturing processes. For example and without limitation, the detent member 260 or the detent members 260a,b, the tool body 210, and other components can be fabricated using subtractive manufacturing processes such as machining, forging, stamping; additive manufacturing processes such as three dimensional printing; and any other forming and assembly processes as desired.

In some aspects, the biasing element 500, including the biasing element 500 shown in FIG. 5, can be formed from or comprise a compressible and resilient material, which can be or can comprise an elastomeric material such as, for example and without limitation, styrene-butadiene rubber (SBR), Buna-N rubber (i.e., nitrile rubber or acrylonitrile butadiene rubber), ethylene propylene diene (EPDM) rubber, natural rubber, or silicone. In some aspects, the material can be approved by NSF International. In some aspects, the biasing element 500, including the biasing element 500 shown in FIG. 8, can be formed from or comprise a rigid material, which can be or can comprise an any metal, polymer, or non-metallic or non-polymer material.

A method of using the tool 100 can comprise obtaining the tool 100, which can comprise the tool body 210 and the detent member 260 or the detent members 260a,b. The method can comprise assembling and forming the detent member 260 or the detent members 260a,b by hand. In some aspects, the method can comprise replacing the detent member 260 or the detent members 260a,b (i.e., assembling and forming anew the detent member 260 or the detent members 260a,b) before each use of the tool 100. The method can comprise receiving the detent member 260 of the tool body 210 within the recess 280 of the tool body 210 upon one of deformation and movement of the leg 270. The method can comprise deforming or moving the leg 270 by pushing the leg 270 in a radially inward direction against a biasing of the leg 270 in a radially outward direction. Pushing the leg 270 can comprise pushing the leg 270 with an edge of the hole 1480 formed in a portion of the pipe 80. The method can comprise passing the detent member 260 of the tool 100 through the hole 1480 formed in the portion of the pipe 80. The method can comprise inserting the tool head 200 of the tool 100 into the hole 1480 of the pipe coupon 85 in the insertion direction 1510. The method can comprise catching the detent member 260 upon the portion of the pipe 80. More specifically, the method can comprise catching the detent member 260 upon the inner surface 81 of the pipe 80. The method can comprise moving or otherwise manipulating the pipe coupon 85 with the tool 100. More specifically, the method can comprise removing the pipe coupon 85 from the pipe 80 or from the pipe portions 80a,b with the tool 100.

The method of receiving the detent member 260 of the tool head 200 within the recess 180 of the tool body 210 can comprise pushing the leg 270 in a radially inward direction. In some aspects, the wall 285 of the recess 280 can bias the leg 270 in a radially outward direction. In some aspects, the biasing element 500 of the tool 100 can bias the leg 270 in a radially outward direction. The method can comprise expanding, extending, or opening the detent member 260 on an inside of the pipe 80, at which time an effective diameter of the detent member 260 or the detent members 260a,b can be greater than a diameter of the hole 1480 formed in the portion of the pipe. In some aspects, the method can comprise re-using one or more of the detent members 260. In some aspects, the method can comprise replacing one or more of the detent members 260. The method can comprise shearing one or more of the detent members 260 to facilitate removal of the tool head 200 from the pipe coupon 85, which can be possible because of the relatively small diameter of the detent member 260. More specifically, the method can comprise shearing one or more of the detent members 260 to facilitate removal of the tool head 200 from the pipe coupon 85 before completing removal of the coupon from the pipe 80. The method can comprise a user sensing passage of the tool head 200 through the hole 1480 by sensing retraction and extension of the detent members 260 during and after passage of the detent station 250 through the hole 1480.

In some methods, the method of using the tool 100 can comprise tapping the pipe 80 from above with the tool 100. In some aspects, the method of using the tool 100 can comprise tapping the pipe 80 from below with the tool 100. More specifically, the method can comprise tapping the pipe 80 from below in a vertical direction. In such aspects, gravity can fight the design of a tool 100 and even defeat a tool 100 that depends entirely on gravity for the rotation of the detent members. In some aspects, the method can comprise "hot tapping" the pipe 80 with the tool 100, i.e., tapping into the pipe 80 when it is pressurized.

The method can comprise spacing the detent stations 250 (e.g., the offset distance 970 shown in FIG. 13) such that the pipe coupon 85 will not fall downward after it is cut free from the pipe 80 by the tool 100. The tool 100 can comprise a plurality of detent stations 250 for a variety of reasons including to increase the likelihood that one of the detent stations 250 will fit a particular pipe 80 and actually catch on same upon movement of the tool 100 in the removal direction 1610 (shown in FIG. 16). Proving a starting angle 267 from which the detent members 260 can fall—which can be set by use of the wall 285 or the biasing element 500—can facilitate rotation of the detent members 260 from the non-extended or non-engaged position to the extended or engaged position and thereby engagement of the detent members 260 with the pipe 80. Use of the wall 285 or the biasing element 500 can additionally facilitate rotation of the detent members 260 from the non-engaged position to the extended or engaged position even when debris is caught in or around or damage has been done to the detent members 260, especially debris or damage that an operator does not or cannot see. Use of the wall 285 or the biasing element 500 can additionally compensate for irregularities resulting from hand-forming and hand-fitting of the detent members 260 in the tool 100 that, without the wall 285 or the biasing element 500, results in a detent member 260 that does not both retract into the recess 280 and also protrude from the recess 280 to catch upon and facilitate removal of the pipe coupon 85.

The method of extracting the pipe coupon 85 from the pipe 80 can comprise inserting the tool head 200 of the tool 100 into the hole 1480 cut into the pipe coupon 85 in the insertion direction 1510, which can correspond to the cutting direction 1310 in some aspects described above. The method can comprise pulling the tool head 200 in the removal direction 1610, which can be opposite from the insertion direction 1510. The method can comprise engaging a portion of one or more of the detent members 260 with the inner surface 81 of the pipe 80. The method can comprise locking passage of the tool head 200 through the hole 1480 of the pipe coupon 85 in an engaged position. The method can comprise pulling the pipe coupon 85 away from the pipe 80 with the tool head 200.

The method can comprise one or more of the detent members 260 rotating between a non-extended position and an extended position of the detent members 260. In some aspects, the method can comprise using two detent members 260 in each of the detent stations 250, which can double the likelihood that of the detent members 260 will catch on the pipe coupon 85 and pull the pipe coupon 85 straight out without tilting the pipe coupon 85 at an angle and/or snagging of the pipe coupon 85 on the pipe 80 upon removal. The method can comprise one or more of the detent members 260 making an audible click sound or the user feeling the detent member 260 click into engagement with the hole 1480 of the pipe coupon 85. Such clicks, whether audible or tactile or both, can provide feedback to the user that the tool 100 has engaged with the pipe coupon 85 in a way that can be more effective than other detent designs such as, for example, a ball detent. The method can comprise measuring a diameter of the pipe 80 and marking the tool head or the tool at a distance from a tip defined by the second end 106 of the tool 100 equal to the diameter. By such measurement and marking, an operator can also confirm when the drill is through the opposite wall 83 of the pipe 80. If a measurement system used during an operation for cutting the pipe coupon 85 fails during the cut, the method of using the tool can comprise shearing the detent members 260, removing the tool 100, and restarting the process after any necessary repairs. Such engagement can in some aspects be confirmed through visual inspection of an interface between the tool 100 and the pipe coupon 85. The method step of engaging a portion of one or more of the detent members 260 with the inner surface 81 of the pipe coupon 85 can comprise further comprising manipulating a position of the tool head 200 with the tool extension 1450 secured to the first end of the tool head 200, optionally with the handle portion 252.

The method can comprise lifting the pipe coupon 85 from the pipe 80. The method can more specifically comprise lifting the pipe coupon 85 past an insertion valve (not shown). The method can comprise closing the insertion valve. The method can then comprise draining the insertion valve. The method can comprise gaining access to the tool 100 and the pipe coupon 85 by disassembly and/or removal of a portion of the insertion valve. The method can comprise and releasing one or more of the detent members 260 from engagement with the pipe coupon 85.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A tool comprising:
   a tool body defining a recess defining a recess depth measured in a radial direction from an outer diameter of the tool body; and
   a detent member coupled to the tool body, the detent member comprising a leg extending from the tool body and sized to be received within the recess of the tool body upon one of deformation and movement of the leg at least partly in a radially inward direction, the leg biased in a radially outward direction by one of a wall of the recess and a biasing element of the tool, the leg configured to catch upon a portion of a pipe coupon surrounding a drilled hole in the pipe coupon to facilitate movement of the pipe coupon with the tool.

2. The tool of claim 1, wherein the detent member comprises a mounting portion extending through a detent member bore of the tool body, the mounting portion configured to rotate inside the detent member bore.

3. The tool of claim 2, wherein the detent member comprises a second leg extending from the mounting portion and sized to be received within the recess of the tool body upon deformation of at least one of the first and second legs and the biasing element during use, the second leg configured to catch upon a second portion of the pipe coupon surrounding the drilled hole in the pipe coupon to facilitate movement of the pipe coupon with the tool.

4. The tool of claim 1, further comprising a second detent member coupled to the tool body, the second detent member comprising a leg extending from the tool body and sized to be received within one of the recess of the tool body and a second recess of the tool body upon one of deformation and movement of the leg, the leg of the second detent member biased in a radially outward direction by one of 1) the wall of the recess or a wall of the second recess and 2) the biasing element of the tool or a second biasing element of the tool, the leg of the second detent member configured to catch upon a second portion of the pipe coupon surrounding the drilled hole in the pipe coupon to facilitate movement of the pipe coupon with the tool.

5. The tool of claim 4, wherein the second detent member is sized to be received within the second recess of the tool body upon one of deformation and movement of the leg, the second recess offset in a longitudinal direction with respect to the recess relative to an axis of the tool body.

6. The tool of claim 1, wherein the detent member defines a constant cross-section from a first end to a second end thereof.

7. The tool of claim 1, wherein the detent member is formed from wire defining a circular shape in cross-section.

8. The tool of claim 1, wherein a minimum value of an axial length of the recess at the wall defined in an axial end of the recess is less than a maximum value of the axial length.

9. The tool of claim 1, further comprising the biasing element, the biasing element configured to bias the leg of the detent member in a radially outward direction beyond the outer diameter of the tool body in a default condition of the tool.

10. The tool of claim 1, wherein the tool comprises a drill bit.

* * * * *